United States Patent
Rho et al.

(10) Patent No.: US 7,800,724 B2
(45) Date of Patent: Sep. 21, 2010

(54) LIQUID CRYSTAL DISPLAY PANEL AND MANUFACTURING METHOD THEREOF

(75) Inventors: Soon-Joon Rho, Suwon-si (KR);
Jang-Sub Kim, Suwon-si (KR);
Baek-Kyun Jeon, Yongin-si (KR);
Hee-Keun Lee, Suwon-si (KR);
Jae-Chang Kim, Busan (KR);
Tae-Hoon Yoon, Busan (KR);
Phil-Kook Son, Busan (KR);
Jeung-Hun Park, Gyeongsangnam-do (KR)

(73) Assignees: Samsung Electronics Co., Ltd., Gyeonggi-do (KR); Pusan National University, Busan (KR)

( * ) Notice: Subject to any disclaimer, the term of this patent is extended or adjusted under 35 U.S.C. 154(b) by 96 days.

(21) Appl. No.: 11/999,380

(22) Filed: Dec. 4, 2007

(65) Prior Publication Data
US 2008/0158492 A1    Jul. 3, 2008

(30) Foreign Application Priority Data
Dec. 5, 2006    (KR) .................... 10-2006-0122073

(51) Int. Cl.
*G02F 1/1337*    (2006.01)
(52) U.S. Cl. .............. 349/123; 349/124; 349/125; 349/126; 349/127; 349/128; 349/129; 349/130; 428/1.2; 428/1.21; 428/1.23
(58) Field of Classification Search ......... 349/123–130, 349/187; 428/1.23, 1.21
See application file for complete search history.

(56) References Cited
U.S. PATENT DOCUMENTS
6,426,786 B1    7/2002    Lu et al.

2002/0063830 A1 *    5/2002    Callegari et al. ............ 349/124
2002/0186336 A1    12/2002    Andry et al.

(Continued)

FOREIGN PATENT DOCUMENTS
JP    62115425 A    *    5/1987

(Continued)

OTHER PUBLICATIONS
English Language Abstract, Publication No. JP 2005-274641, Oct. 6, 2005, 1 p.

(Continued)

*Primary Examiner*—David Nelms
*Assistant Examiner*—Thanh-Nhan P Nguyen
(74) *Attorney, Agent, or Firm*—Innovation Counsel LLP

(57) ABSTRACT

The present invention provides a liquid crystal display ("LCD") panel and manufacturing method thereof. The LCD panel in accordance with the present invention includes a lower substrate including a thin film transistor and a pixel electrode, an upper substrate including a common electrode facing the lower substrate, a liquid crystal layer formed between the upper and lower substrates, and an alignment layer formed of an inorganic substance containing silicon (Si), oxygen (O), and carbon (C) on the upper and lower substrates. The transmittance of light through the LCD panel is high and is practically independent of the deposition temperature of the SiOC alignment layer over a wide range of deposition temperatures. The deposition of the alignment layer can be performed over a wide range of deposition temperatures while maintaining high levels of light transmission.

13 Claims, 10 Drawing Sheets

U.S. PATENT DOCUMENTS

| | | | |
|---|---|---|---|
| 2005/0233576 A1* | 10/2005 | Lee et al. | 438/623 |
| 2007/0224365 A1* | 9/2007 | Callegari et al. | 428/1.1 |
| 2008/0018841 A1* | 1/2008 | Rho et al. | 349/124 |
| 2008/0055527 A1* | 3/2008 | Kurasawa | 349/123 |
| 2008/0123036 A1* | 5/2008 | Sasaki et al. | 349/124 |

FOREIGN PATENT DOCUMENTS

| | | |
|---|---|---|
| JP | 2005-274641 | 10/2005 |
| KR | 10-2006-0066284 | 6/2006 |
| KR | 10-2006-0093070 | 8/2006 |

OTHER PUBLICATIONS

English Language Abstract, Publication No. KR 2006-066284, Jun. 16, 2006, 1 p.

English Language Abstract, Publication No. KR 2006-093070, Aug. 23, 2006, 1 p.

Son, Phil et al., "Vertical alignment of liquid crystal on a-SiOx thin film using the ion beam exposure", Applied Physics Letters, AIP, American Institute of Physics, Melville, NY, US, vol. 88, No. 26, 2-6-06-28, 3 pp.

Hong, W.S. et al., "Fabrication of novel TFT LCD panels with high aperture ratio using a-SiC0:H films as a passivation layer", Amorphous and Nanocrystalline Silicon-Based Films, 2003 Symposium, Apr. 22-25, 2003, San Francisco, CA, USA, 2003, pp. 265-270.

Search Report, Corresponding to EP 07023448.9, Sep. 2, 2009, 9 pages.

* cited by examiner

LIGHT

LIQUID CRYSTAL DISPLAY PANEL AND MANUFACTURING METHOD THEREOF

CROSS REFERENCE TO RELATED APPLICATION

This application claims the benefit of priority of Korean Patent Application No. 10-2006-0122073 filed in the Korean Patent Office on Dec. 5, 2006, the entire content of which is incorporated by reference herein.

BACKGROUND OF THE INVENTION

1. Field of the Invention

The present invention relates to a liquid crystal display ("LCD") device and, more particularly, to an LCD panel and a manufacturing method thereof.

2. Discussion of the Related Art

Recently, various kinds of flat panel display devices have been developed. These flat panel display devices share the advantages of reduced thickness and volume when compared to a cathode ray tube. The flat panel display devices include liquid crystal display devices, plasma display panel devices, field emission display devices, and electroluminescent display devices.

An LCD panel generally includes a color filter substrate provided with a color filter array and a thin film transistor substrate provided with a thin film transistor array including a plurality of thin film transistors ("TFT"), a plurality of pixel electrodes and a plurality of signal lines. A layer of a liquid crystal material is injected between the two substrates. Thus, the process of manufacturing the LCD panel is completed. Such an LCD device displays a desired image by adjusting the amount of light transmitted through the panel at each pixel location. For this purpose an electric field is applied to the liquid crystal injected between the two substrates, the liquid crystal having an anisotropic permittivity and then the strength of the electric field is adjusted.

The liquid crystal of the related art LCD panel rotates through a predetermined angle relative to a pretilt angle established by an alignment layer or by slits formed on common and pixel electrodes, thus adjusting the amount of light transmitted through the panel. Here, a printing process is used to define the alignment direction of the alignment layer, and deposition and etching processes are required to form a slit pattern on the common and pixel electrodes. Accordingly, the number of processes is increased, which results in an increase in processing time and material cost.

SUMMARY OF THE INVENTION

The present invention provides an LCD panel and a manufacturing method thereof wherein the LCD display panel includes a SiOC alignment layer that has advantageous properties that are insensitive to the temperature of deposition process over a wide range of deposition temperatures. Further, the alignment direction of the SiOC alignment layer can be changed by ion beam bombardment.

In one aspect of the present invention, the invention provides a liquid crystal display panel including: a lower substrate including a thin film transistor and a pixel electrode; an upper substrate including a common electrode facing the lower substrate; a liquid crystal layer formed between the upper and lower substrates; and an alignment layer formed of an inorganic substance containing silicon (Si), oxygen (O), and carbon (C) on the upper and lower substrates.

Preferably, the inorganic substance is silicon oxycarbide (SiOC).

Suitably, the inorganic substance has a chemical formula of $SiOC_x$ where x is between about 0.12 and about 1.89.

Moreover, the thickness of the alignment layer is between about 30 nm and about 500 nm.

Furthermore, an alignment direction of the liquid crystal layer has a pretilt angle in a range from about 85° to about 90°, the pretilt angle being set by the SiOC.

In addition, the alignment layer has a resistivity of about $1\times10^{15}$ Ωcm to about $3\times10^{15}$ Ωcm.

Moreover, the transmittance of the liquid crystal display panel for wavelengths between 450 nm and 700 nm is in the range from about 83% to about 86%.

In another aspect, the present invention provides a method of manufacturing a liquid crystal display panel, the method including: forming an upper substrate including a common electrode; forming a lower substrate including a thin film transistor and a pixel electrode and facing the upper substrate; and depositing an alignment layer on the upper and lower substrates, the alignment layer comprising an inorganic substance containing silicon (Si), oxygen (O), and carbon (C).

Preferably, the alignment layer is formed with a thickness of about 30 nm to about 500 nm.

Suitably, the inorganic substance is silicon oxycarbide (SiOC).

Moreover, the chemical formula of the inorganic substance is $SiOC_x$ where x is between about 0.12 and about 1.89.

Furthermore, the alignment layer is deposited in the temperature range of about 30° C. to about 400° C.

In addition, the alignment layer has a liquid crystal alignment direction in the range from about 85° to about 90°.

Preferably, the method of the present invention further includes changing the liquid crystal alignment direction on the alignment layer by using an ion beam system.

Suitably, the process of changing the liquid crystal alignment direction includes: directing an ion beam at the alignment layer; and defining the liquid crystal alignment direction by setting an incident angle of the ion beam.

Moreover, the incident angle is between about 20° and about 90°.

Furthermore, the liquid crystal alignment direction of the alignment layer is set at an angle between about 79° and about 90° depending on the incident angle of the ion beam.

It is to be understood that both the foregoing general description and the following detailed description of the present invention are exemplary and explanatory and are intended to provide further explanation of the invention as claimed.

DETAILED DESCRIPTION OF THE INVENTION

Exemplary embodiments of the present invention, examples of which are illustrated in the accompanying drawings, are below described in detail. Wherever possible, the same reference numbers will be used throughout the drawings to refer to the same or like parts.

Exemplary embodiments of the present invention will be described with reference to FIGS. 1 to 10 as follows.

Figure 1:
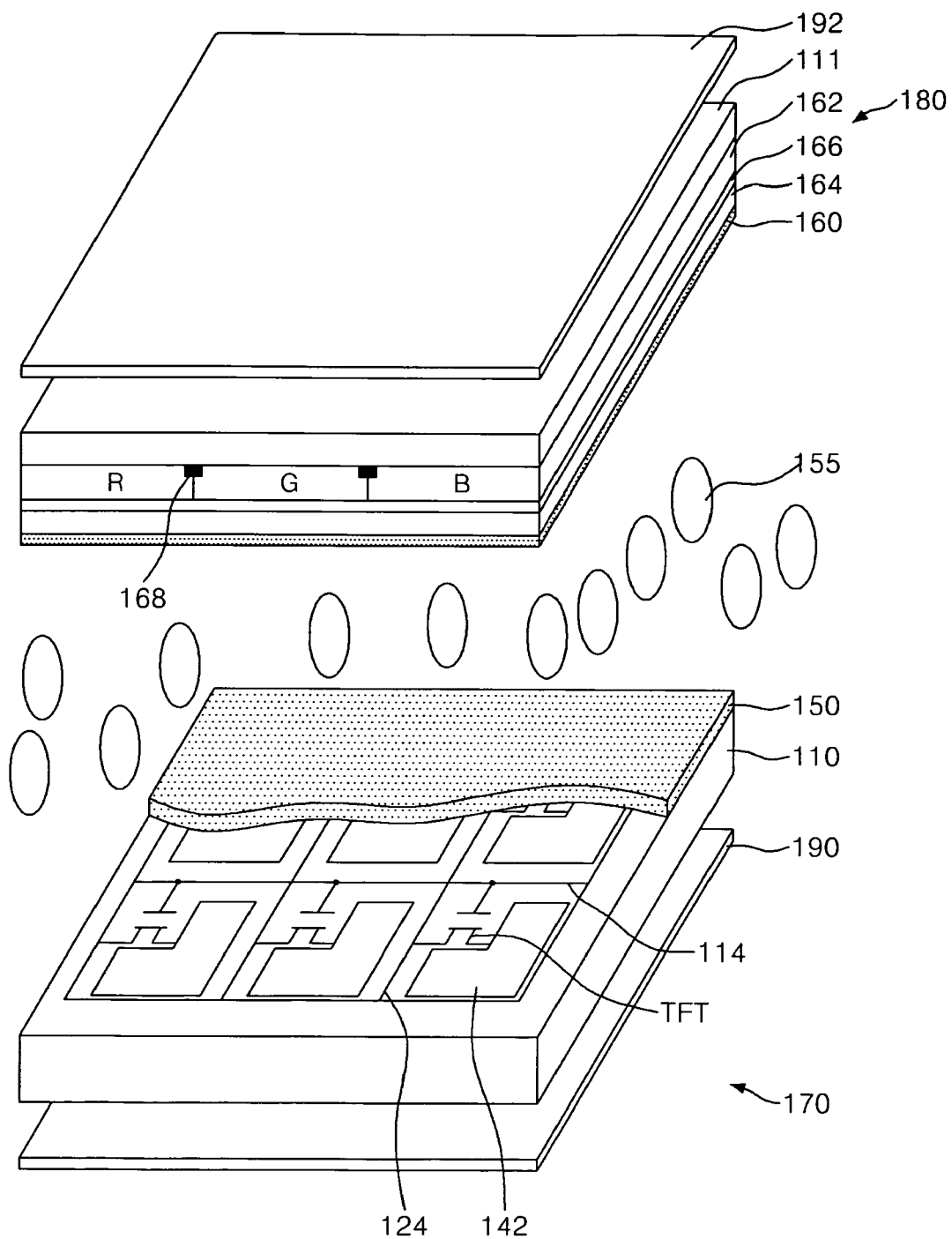
FIG. 1 is a perspective view of an LCD panel according to the present invention.
Figure 2:
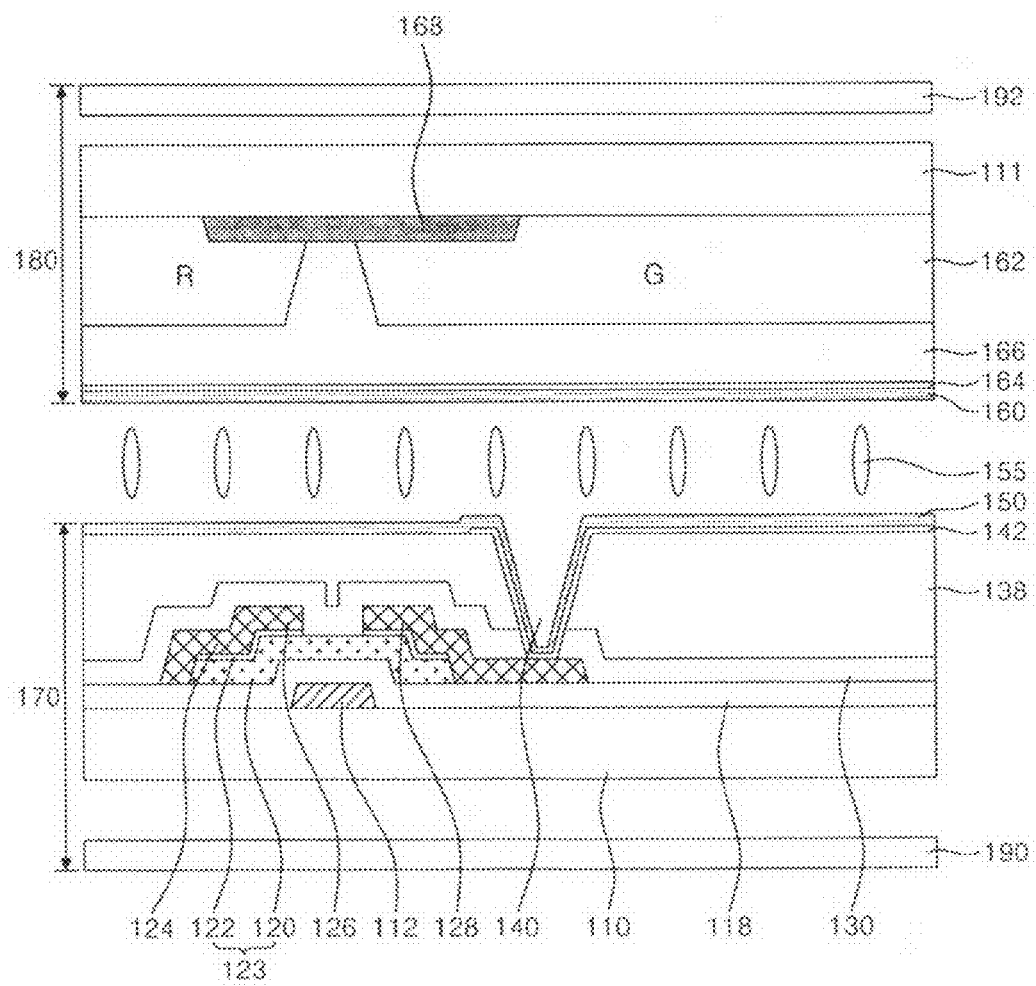
FIG. 2 is a cross-sectional view of a portion of the LCD panel shown in FIG. 1.

FIG. 1 is a perspective view of an LCD panel according to the present invention, and FIG. 2 is a cross-sectional view of a portion of the LCD panel shown in FIG. 1.

Referring to FIGS. 1 and 2, an LCD panel according to the present invention includes a color filter substrate 180, a TFT substrate 170, and a layer of liquid crystal molecules 155 injected between the two substrates 180 and 170, the two substrates being bonded to each other.

The color filter substrate 180 includes a color filter array 162 disposed on an upper substrate 111, a black matrix 168, a common electrode 164, an upper alignment layer 160, and an upper polarizing plate 192.

The color filter array 162 includes red, green and blue color filters R, G and B. The red, green and blue color filters R, G and B contain pigments to provide red, green and blue colors, respectively.

The black matrix 168 is formed to overlap the boundaries of pixel areas and the boundaries of color filters in the color filter array 162, and to overlap gate lines 114, data lines 124 and TFTs on the TFT substrate 170. The black matrix 168 improves the contrast of the LCD panel by shielding light transmission that arises due to misalignment of the substrates, and prevents light induced leakage current in the TFTs by shielding the TFTs from direct exposure to light.

An overcoat layer 166 is formed on the color filter array 162 to provide a planar surface. The common electrode 164 is formed on the overcoat layer 166. In operation, a common voltage is applied to the common electrode 164 and pixel voltages are applied to pixel electrodes 142. The common electrode 164 is formed of a transparent and conductive substance such as ITO (indium tin oxide) or IZO (indium zinc oxide).

The upper polarizing plate 192 is attached to a backside of the upper substrate 111 to control the amount of light transmission and polarization state of an incident beam. The upper polarizing plate 192 is formed by heating and elongating a thin layer of polyvinyl alcohol and then immersing the resulting layer in a dichroic dye solution containing iodic acid. The upper polarizing plate 192 has an elongation axis in the direction in which the plate is elongated and a transmittance axis that is parallel to the plane of the plate and perpendicular to the elongation axis.

The TFT substrate 170 includes pixel areas with a TFT connected to a gate line 114 and a data line 124 formed on a lower substrate 110. The TFT substrate 170 also includes a lower alignment layer 150, and a lower polarizing plate 190.

The TFT supplies a video signal from the data line 124 to a pixel electrode 142 formed in each pixel ares in response to a scan signal applied to the gate line 114. The TFT includes a gate electrode 112 connected to the gate line 114, a source electrode 126 connected to the data line 124, a drain electrode 128 connected to the pixel electrode 142, an active layer 120 of a semiconductor pattern 123 overlapping the gate electrode 112 and overlying a gate insulating layer 118 to form a channel between the source electrode 126 and the drain electrode 128, and an ohmic contact layer 122 of the semiconductor pattern 123, the ohmic contact layer being formed on the active layer 120, other than the channel area to provide ohmic contact to the source and drain electrodes 126 and 128.

The gate line 114 supplies a scan signal from a gate driver to the gate electrode 112 of the TFT. The data line 124 supplies a video signal from a data driver to the source electrode 126 of the TFT. The gate and data lines 114 and 124 are configured to intersect each other to form an array of pixel areas.

The pixel electrode 142, formed on the passivation layer 138, is connected to the drain electrode 128 of the TFT via a contact hole 140. The pixel electrode 142 is formed of a transparent conductive layer. In operation, a video signal is applied via the TFT to the pixel electrode 142 to generate an electric field in the layer of liquid crystal molecules 155 between the common electrode 164 to which a common voltage is applied and the pixel electrode 142. The alignment direction of the liquid crystal molecules 155 between the two electrodes 142 and 164 is dependent on the value of the voltage that is applied to the pixel electrode and changes in response to changes in the applied voltage. Accordingly the transmittance of light passing through the liquid crystal molecules 155 is changed, thereby implementing a gray scale level.

The passivation layers 130 and 138 are provided between the TFT and the pixel electrode 142 to protect the data line 124 and the TFT. Here, the passivation layers 130 and 138 may be formed as a double layer of inorganic and organic layers. Alternatively the passivation layers 130 and 138 may be formed as a single layer of either inorganic or organic material. The organic passivation layer 138 is preferably formed by using a thick layer of low permittivity material so that the pixel electrode 142 may overlap the gate line 114 and the data line 124 with minimum parasitic capacitance, thus improving an opening ratio of the pixel electrode 142.

The lower polarizing plate 190 is attached to a backside of the lower substrate 110 to control the transmitted amount and polarization state of light exiting the polarizing plate 190. Since the lower polarizing plate 190 has the same configuration as the upper polarizing plate 192, a detailed description thereof will be omitted.

Figure 3:
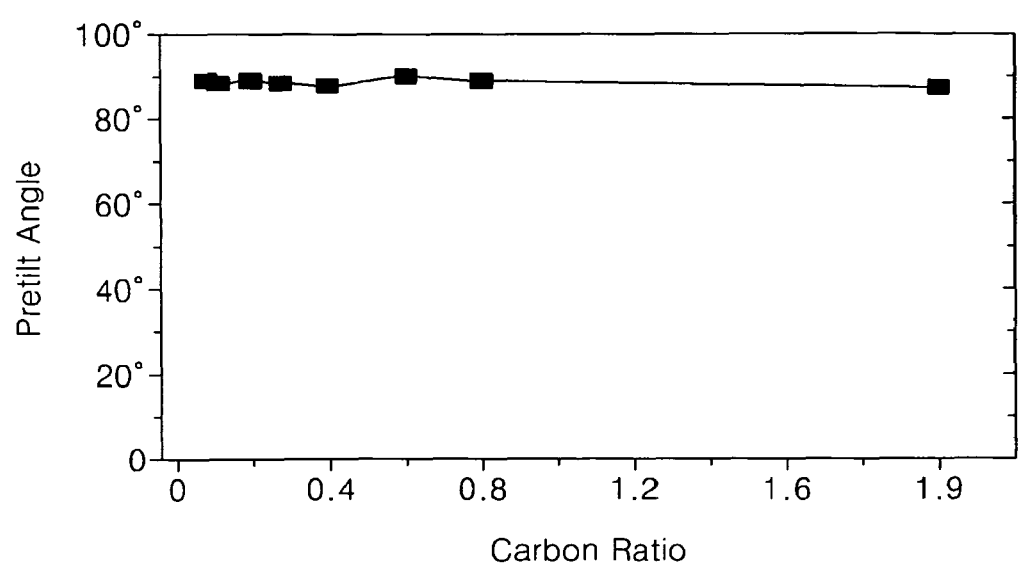
FIG. 3 is a graph showing liquid crystal pretilt alignment angle versus the carbon ratio in SiOC containing silicon, oxygen and carbon in an LCD panel shown in FIG. 1.

The upper and lower alignment layers 160 and 150 determine the alignment direction of the liquid crystal molecules 155 provided between the TFT substrate 170 and the color filter substrate 180. The upper alignment layer 160 is formed on the upper substrate 111 on which the black matrix 168, the color filter array 162 and the common electrode 164 are formed. The lower alignment layer 150 is formed on the lower substrate 110 on which the TFT and the pixel electrode 142 are formed. In particular, the liquid crystal molecules 155 are vertically aligned using an oxygen-doped silicon carbide (SiC), that is, silicon oxycarbide (SiOC). FIG. 3 is a graph showing liquid crystal pretilt alignment angles versus a carbon (C) ratio or composition range of carbon in SiOC when used in the LCD panel shown in FIG. 1. In more detail, the X-axis represents the carbon ratio when silicon (Si) is '1' in SiOC, and the Y-axis represents liquid crystal alignment angles or pretilt angle according to the composition ranges of carbon (C). According to FIG. 3, when the composition range of carbon (C) is in a range from about 0.12 to about 1.89 when silicon is '1' in SiOC, the alignment angles of the alignment layers 150 and 160 are in the range from about 85° to about 90°.

Moreover, by using an ion beam system to modify the alignment layers, the range of the liquid crystal 155 pretilt angle can be changed to a range extending from about 78° to about 90°. The alignment layers 150 and 160 formed of SiOC are deposited on the substrates by a deposition method such as sputtering. For example, a SiOC layer may be formed on the lower and upper substrates 110 and 111 by using an RF (Radio Frequency) magnetron sputtering system. The SiOC layer may be deposited at a temperature lower than 400° C. by argon ions accelerated at 70 eV. Subsequently, the alignment direction of the deposited alignment layers 150 and 160 can be changed by using an ion beam system as shown in FIG. 8B. That is, when the alignment direction of the alignment layers 150 and 160 is rearranged in a multi-domain mode using the ion beam system, it is unnecessary to use separate deposition and etching processes for forming a slit in the common and pixel electrodes of the upper and lower substrates unlike a patterned vertical alignment ("PVA") mode.

In a vertical alignment ("VA") mode, i.e., a wide viewing angle technique in accordance with the present invention, the liquid crystal molecules having negative permittivity anisotropy are vertically aligned and perpendicularly driven by an electric field, thus adjusting the light transmittance. The VA mode becomes a normally black mode since light transmittance is shut by a polarizer perpendicular to the alignment direction of the liquid crystal molecules when a voltage is not applied. Meanwhile, in the VA mode, light is transmitted by a polarizer parallel to the alignment direction of the liquid crystal molecules rotated at a predetermined angle by an applied voltage. In this case, the liquid crystal 155 is vertically aligned by the vertical alignment layers 150 and 160 of SiOC, thereby preventing the light leakage.

Figure 4:
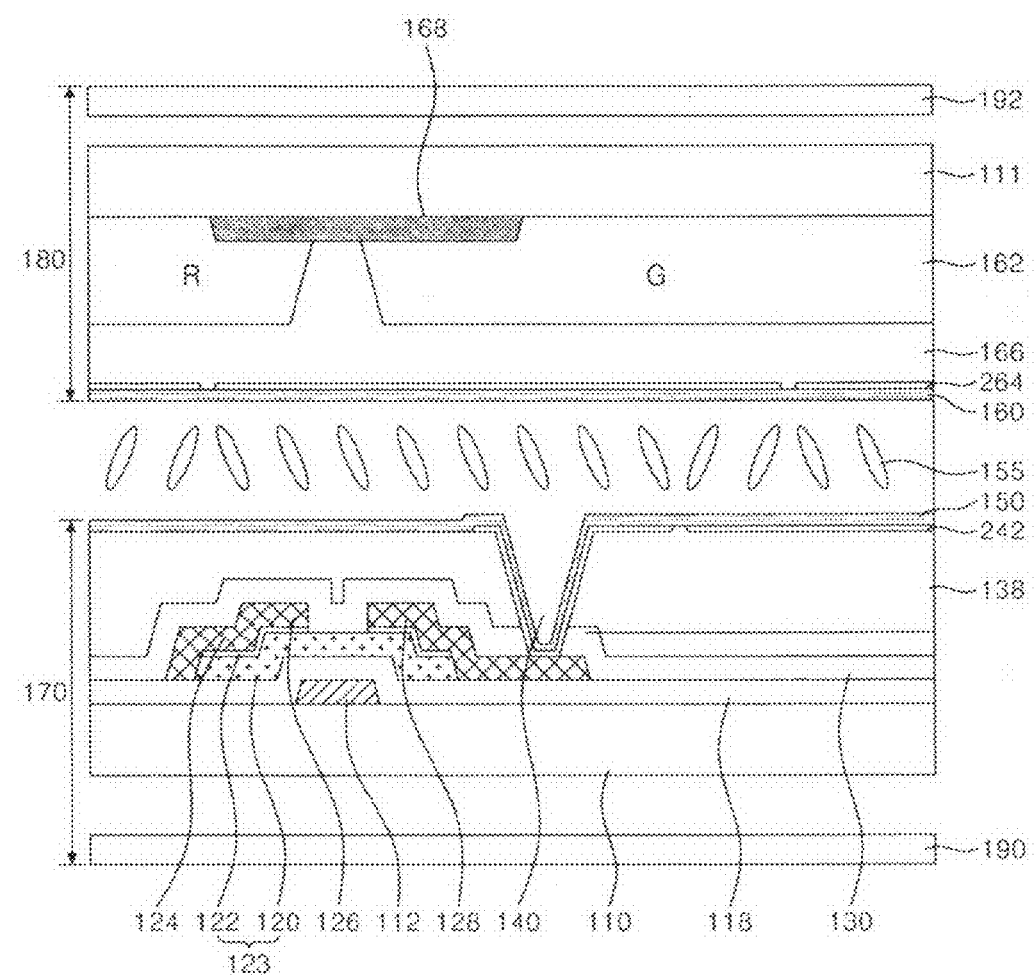
FIG. 4 is a cross-sectional view of an LCD panel according to another embodiment of the present invention.

According to another embodiment of the present invention shown in FIG. 4, it is possible to use the alignment layers 150 and 160 of SiOC in the multi-domain VA mode that obtains a wide viewing angle in a manner that the transmittance change is symmetrically generated by dividing the respective sub-pixels to form a multi-domain and aligning the liquid crystal molecules 155 symmetrically. Accordingly, the alignment layers 150 and 160 of SiOC are formed on the common electrode 264 and a pixel electrode 242 on which the slit pattern is formed. Meanwhile, it is possible to determine the alignment direction of the alignment layers 150 and 160 of SiOC by depositing the same on the common and pixel electrodes 264 and 242 without the alignment direction or by using the ion beam system.

Accordingly, the multi-domain VA mode, e.g., the PVA mode forms the multi-domain in a manner that a slit is provided on the common and pixel electrodes of the upper and lower substrates, and the liquid crystal molecules are symmetrically driven based on the slit using a fringe field generated by the slit.

Figure 5A:
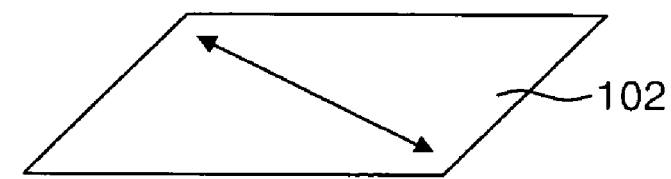
FIG. 5A is a diagram illustrating light transmittance characteristics for first and second polarizing plates.
Figure 5A:
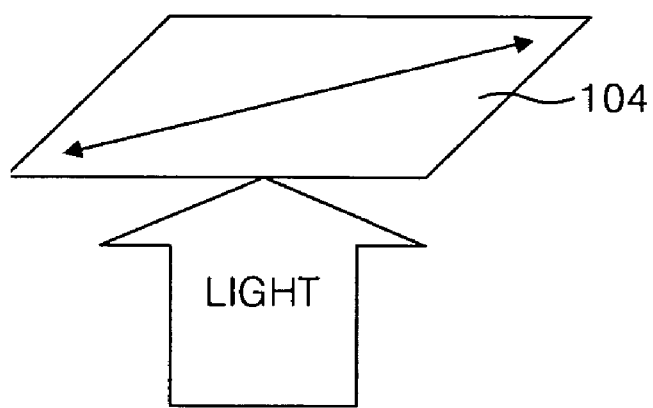
Figure 5B:
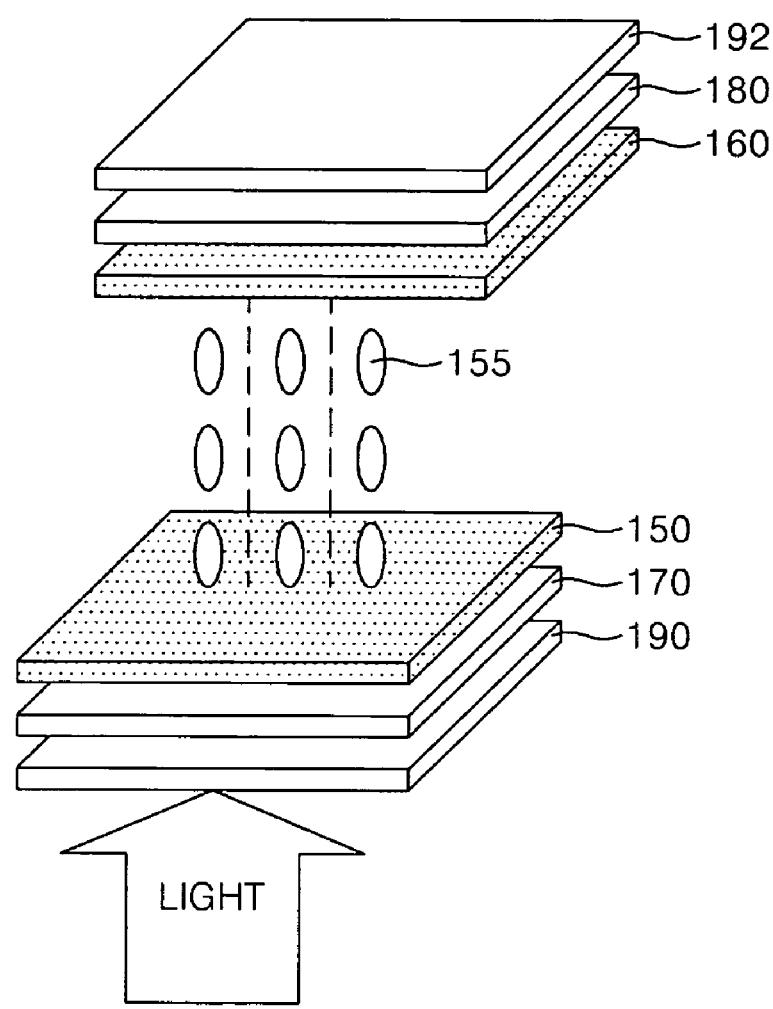
FIG. 5B is a diagram illustrating light transmittance characteristics of an LCD panel according to the present invention.

As shown in FIG. 5A, when light is polarized by a first polarizing plate 104, the light is not transmitted by a second polarizing plate 102, the second polarizing plate 102 having a polarizing axis forming an angle of 90° with the polarizing axis of the first polarizing plate 104. Likewise, as shown in FIG. 5B, in which the pretilt angle $\theta_T$ is approximately 90°, light is not transmitted by the LCD panel using the vertically aligned SiOC, in accordance with the present invention, in the alignment layers 150 and 160. Accordingly, it is possible to prevent the light leakage by vertically arranging the aligned direction of the alignment layers 150 and 160 so that the liquid crystal molecules 155 are rotated at a predetermined angle according to the rearranged alignment direction. Moreover, it is also possible to prevent crosstalk and flicker caused by the light leakage.

Figure 6:
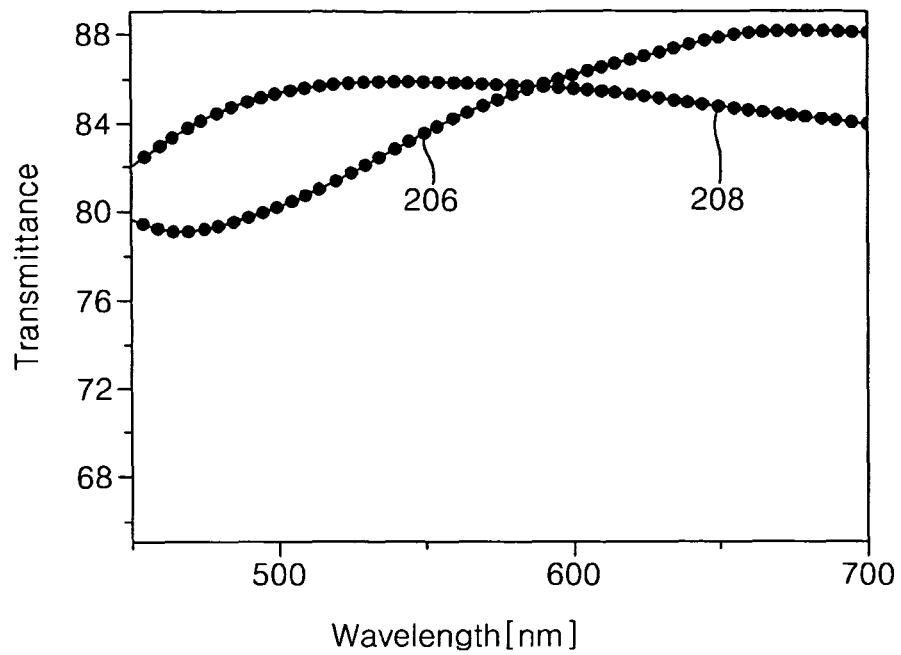
FIG. 6 is a graph illustrating light transmittance characteristics of an LCD panel including an alignment layer formed of SiOC according to the present invention and a related art LCD panel having a polyimide (PI) alignment layer.

FIG. 6 is a graph illustrating light transmittance characteristics of an LCD panel including an alignment layer formed of SiOC according to the present invention and a related art LCD panel in which the alignment layers are formed of polyimide (PI).

Referring to FIG. 6, FIG. 6 shows the transmittance characteristic of the LCD panel in which voltages are applied to establish a voltage difference between the common and pixel electrodes 142 and 164, thus causing the liquid crystal molecules 155 to be rotated at a predetermined angle to transmit light.

The direction of the X-axis in the graph indicates wavelengths in the visible light region and the direction of the Y-axis indicates transmittance characteristics according to the wavelengths. A first curve 206 indicates transmittance characteristics of an LCD panel using polyimide (PI) as in the related art alignment layer, in which the transmittance average of the transmittance characteristics is about 83.2%. On the other hand, a second curve 208 indicates transmittance characteristics of the LCD panel using SiOC in the alignment layers 150 and 160. In this case, the transmittance of the LCD panel of the present invention is between about 83% and 86% with an average value of about 85% between 450 nm and 700 nm, a value that is higher than the average transmittance of the related art LCD panel using the polyimide (PI) alignment layer.

Figure 7:
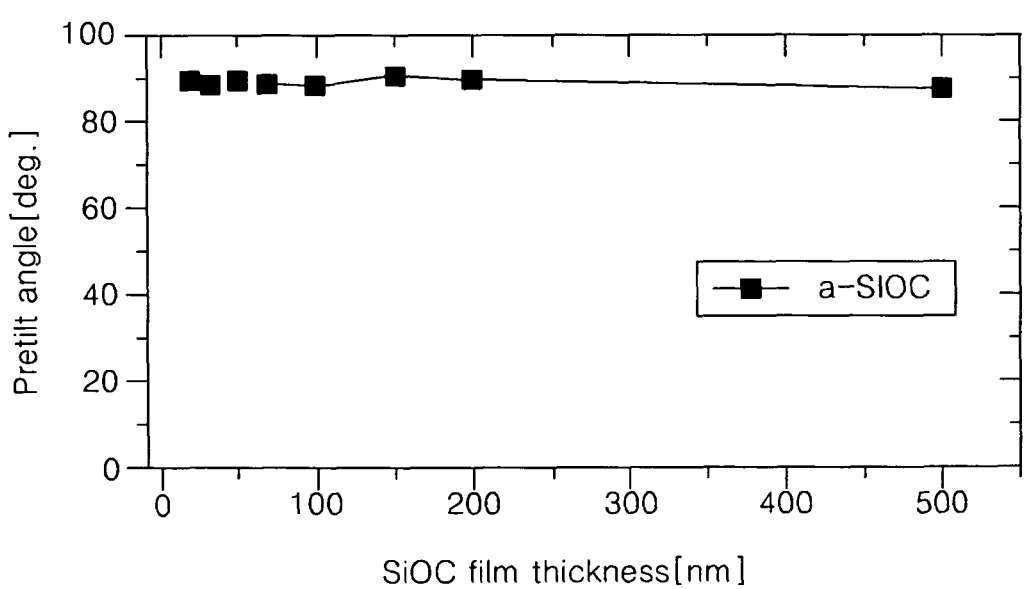
FIG. 7 is a graph illustrating pretilt angles of a liquid crystal layer versus the thickness of an alignment layer of the present invention.

FIG. 7 is a graph illustrating pretilt angles of liquid crystal according to the thickness of the alignment layer 150 or 160 of the present invention.

Referring to FIG. 7, the alignment layers 150 and 160 are formed of an inorganic material, silicon oxycarbide (SiOC). The direction of the X-axis of the graph indicates the thickness of the alignment layers 150 and 160, and the direction of the Y-axis indicates pretilt angles of the liquid crystal 155 vertically aligned by the alignment layers 150 and 160 when a voltage is not applied to the liquid crystal 155. Accordingly, as depicted in the graph of FIG. 7, the alignment layers 150 and 160 have thicknesses in the range from about 30 nm to about 500 nm. The liquid crystal is vertically aligned even when the alignment layers 150 and 560 are formed with thicknesses different from each other. Preferably, the thickness of the alignment layers 150 and 160 is set to about 100 nm.

Meanwhile, the alignment layers 150 and 160 have a high resistivity to maintain the electrical stability or to have a potential equal to that of the liquid crystal layer 155.

As shown in the following Table 1, the resistivity of the alignment layer formed of polyimide, or rather the resistivity of the polyimide is $10^{12} \Omega cm$ (line 4 in Table 1). In contrast, the resistivity of the alignment layer formed of SiOC, or rather the resistivity of the SiOC is between about $1 \times 10^{15} \Omega cm$ and about $3 \times 10^{15} \Omega cm$, as in lines 1, 2, and 3 in Table 1, which is relatively higher than that of the polyimide alignment layer. Moreover, the resistivity of the SiOC increases with the temperature of the SiOC deposition process.

TABLE 1

|   | Deposition temperature | Alignment layer thickness | Resistivity (Ωcm) |
|---|---|---|---|
| 1 | 30° C. | 100 nm | $1 \times 10^{15}$ |
| 2 | 100° C. | 100 nm | $2 \times 10^{15}$ |
| 3 | 200° C. | 100 nm | $3 \times 10^{15}$ |
| 4 | rubbed polyimide | | $10^{12}$ |
| 5 | liquid crystal | | $10^{15}$ |

Accordingly, as the resistivity of the alignment layers 150 and 160 formed of SiOC is approximately equal to that of the liquid crystal layer 155, the resistivity of which is $10^{15}$ Ωcm, the alignment layers 150 and 160 and the liquid crystal layer 155 have an equal potential, and thereby it is possible to solve the problem of image retention of the LCD device.

Figure 8A:
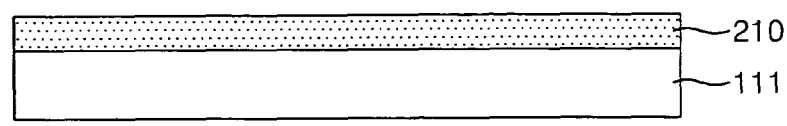
FIGS. 8A to 8C are diagrams illustrating a method of forming an alignment layer of an LCD panel according to the present invention.
Figure 8B:
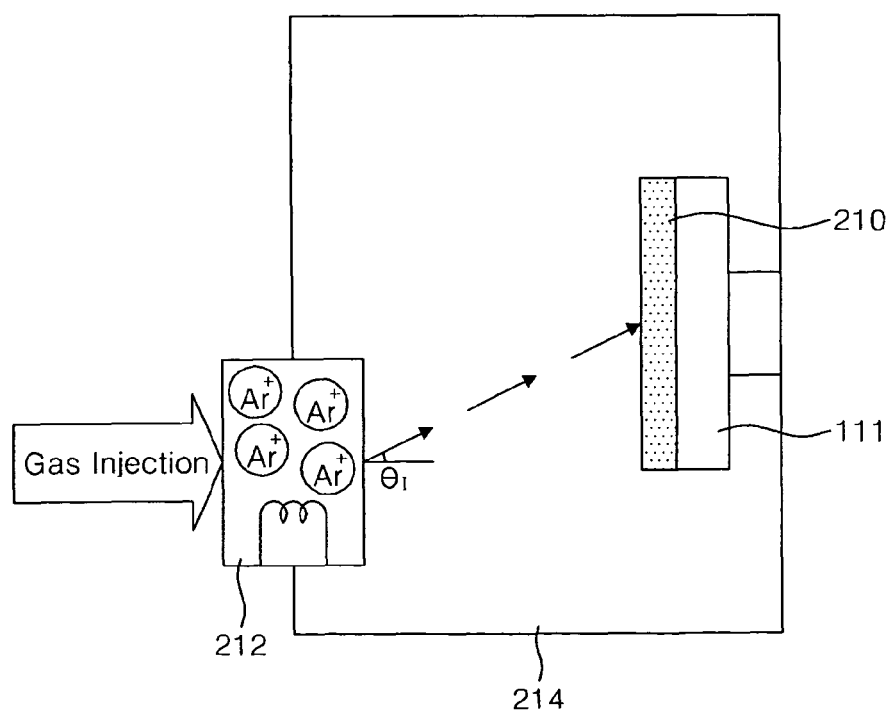
Figure 8C:
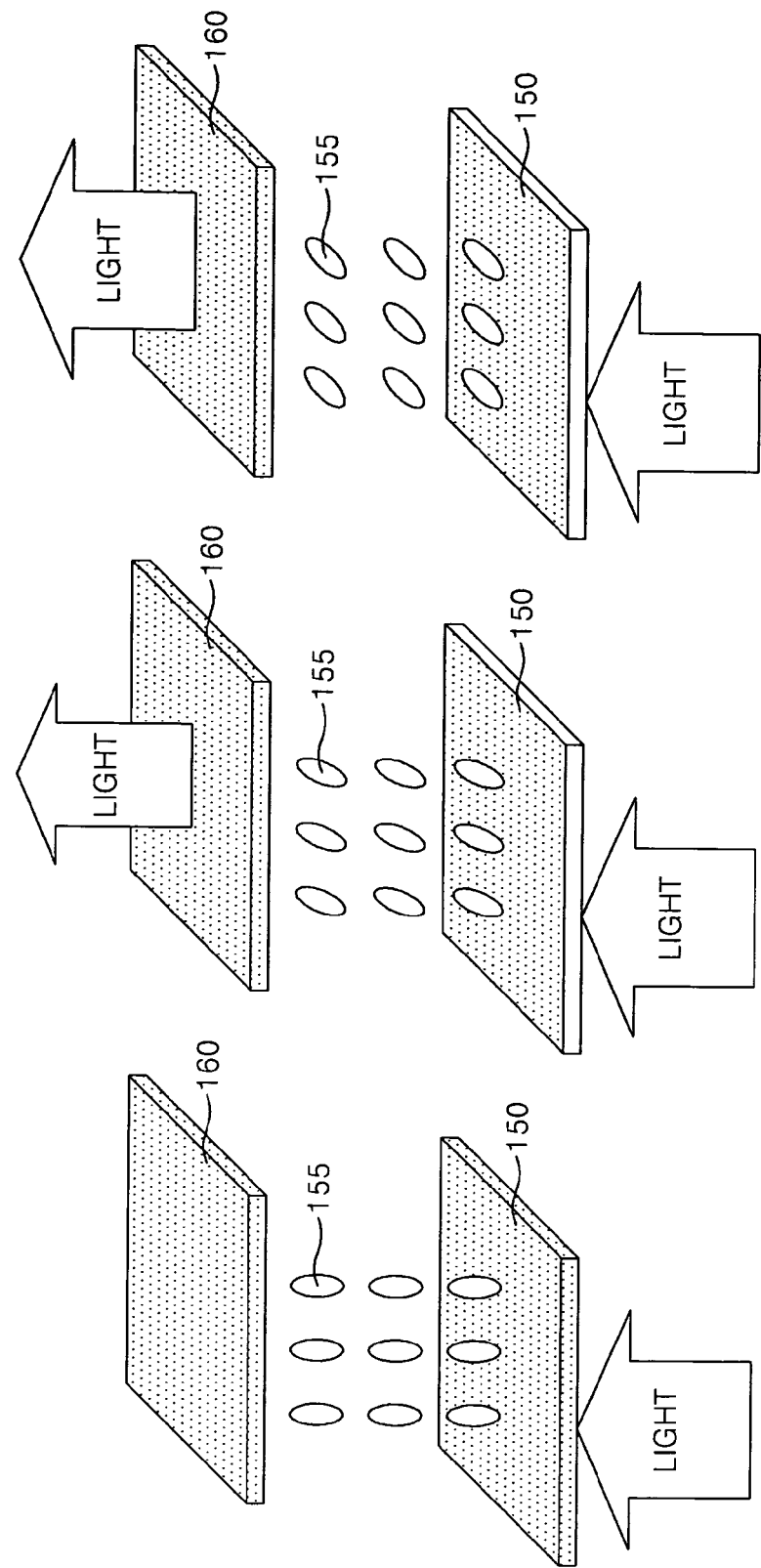
Figure 9:
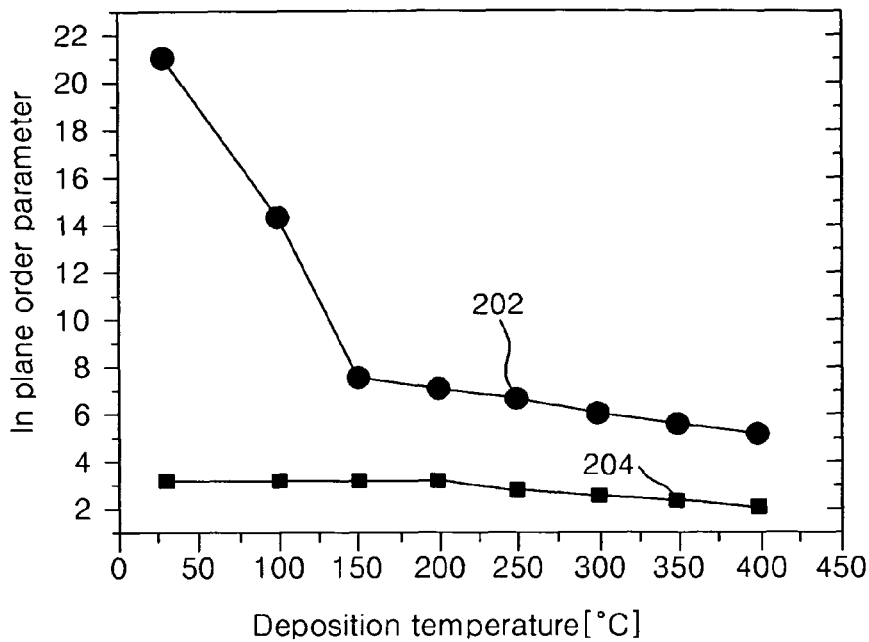
FIG. 9 is a graph illustrating light transmittance characteristics according to the degree of vertical alignment based on deposition temperatures of alignment layers according to the present invention and related art.
Figure 10:
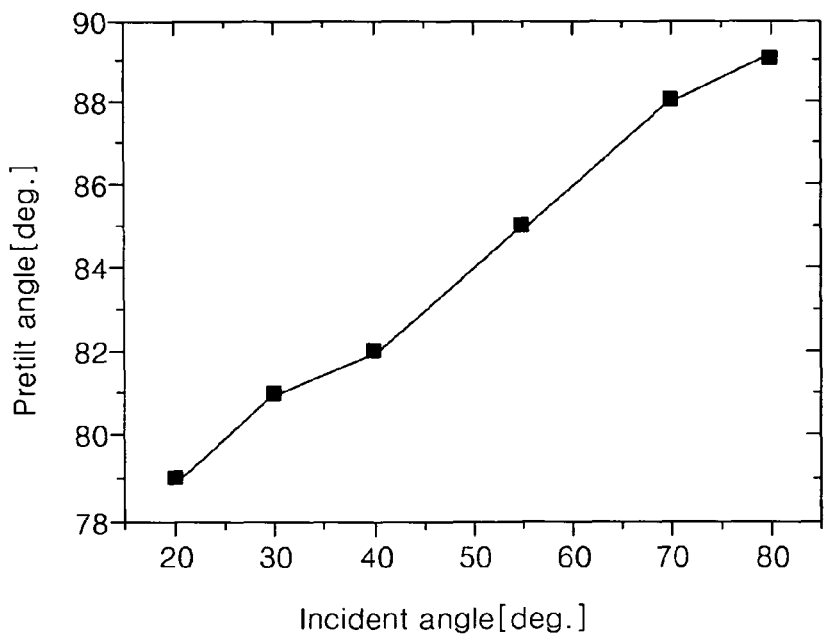
FIG. 10 is a graph illustrating pretilt angles of a liquid crystal layer versus an incident angle of an ion beam.

FIGS. 8A to 8C are diagrams illustrating a method of forming an alignment layer of an LCD panel according to the present invention, FIG. 9 is a graph illustrating light transmittance characteristics according to the degree of vertical alignment based on deposition temperatures of alignment layers according to the present invention and related art, and FIG. 10 is a graph illustrating pretilt angles of a liquid crystal according to an incident angle of an ion beam. An example of an upper alignment layer formed on an upper substrate according to the present invention is described below.

Referring to FIG. 8A, an inorganic alignment layer 210 of silicon oxycarbide (SiOC) is formed on an upper substrate 111 by a deposition method such as sputtering. Also on the upper substrate 111, a black matrix 168 (not shown), a color filter 162 (not shown) and a common electrode 160 (not shown) are formed.

In particular, the alignment layer 210 is formed of silicon oxycarbide (SiOC) containing silicon (Si), oxygen (O), and carbon (C) with a carbon ratio in the range from about 0.12 to about 1.89 when silicon (Si) of 1. The SiOC formed in this range of carbon ratio provides a liquid crystal alignment direction or pretilt angle in a range from about 85° to about 90°.

Moreover, the thickness of the SiOC is preferably set to about 30 nm to 500 nm, and more preferably set to about 100 nm.

In FIG. 9, the vertical axis shows an in-plane order parameter representing values dividing the amount of light transmitted when a liquid crystal layer is inserted between polarizing plates by the amount of light transmitted when no liquid crystal layer is inserted between them. A low in-plane order parameter means good vertical alignment. Curve 202 shows that the transmittance of the related art alignment layer of silicon oxide (SiOx) changes rapidly as the temperature of deposition varies from about 30° C. to about 150° C. Whereas, in FIG. 9, curve 204 shows for the present invention an almost constant curve, in which the vertical alignment is well made and there is almost no change in the light transmission even as the deposition temperature is varied in the range from about 30° C. to about 400° C. when the alignment layer is formed of silicon oxycarbide (SiOC). Accordingly, since the deposition of the alignment layer 210 is not considerably affected by the deposition temperature, the deposition process temperature margin of the alignment layer 210 is improved relative to the deposition process temperature margin for depositing a SiOx alignment layer.

Referring to FIG. 8B, the pretilt alignment direction of a liquid crystal layer may be defined by using an ion beam system to treat the alignment layers formed on the upper and lower substrates.

In more detail, the ion beam system includes an ion source 212 in a vacuum chamber 214. An alignment layer 210 formed on the substrate 111 is positioned within the vacuum chamber 214. A current flowing in a filament within the ion source 212 heats the filament and thereby thermal electrons are emitted from the surface of the heated filament. The emitted thermal electrons collide with argon gas atoms Ar that are injected into the ion source 212 and the emitted thermal electrons ionize the argon gas to form argon ions Ar+, thus generating an ion beam. The ion beam is applied to the alignment layer 210 within the vacuum chamber 214. Here, the ion beam strikes the alignment layer 210 at an angle of incidence θ1 in a range from about 20° to about 90°. As shown in FIG. 10, after ion beam irradiation of the alignment layer 210, the pretilt angle of a liquid crystal layer formed on the alignment layer 210 increases in the range from 79° to 90° as the incident angle θ1 of the ion beam is increased in a range from about 20° to about 90°.

FIG. 8C shows light transmittance characteristics of the LCD panel (not shown) including the alignment layers 150 and 160 of SiOC formed through the processes shown in FIGS. 8A and 8B, exhibited as the liquid crystal molecules 155 are rotated at a predetermined angle by a difference between pixel and common electrode voltages. Namely, when a voltage is not applied to the liquid crystal 155, the liquid crystal molecules 155 are vertically aligned to block light transmittance, whereas, when a voltage is applied to the liquid crystal 155, the liquid crystal molecules 155 are rotated at a predetermined angle to allow light transmittance, thus showing the light transmittance characteristics in FIG. 8C.

As described in detail above, the present invention provides an LCD panel including silicon oxycarbide (SiOC) alignment layers and a manufacturing method thereof.

Furthermore, the present invention provides an LCD panel including silicon oxycarbide (SiOC) alignment layers and a manufacturing method thereof in which the margin of the temperature variation in the depositing process for the alignment layers is improved.

Moreover, when the alignment direction of the alignment layer is set in a multi-domain configuration by changing the pretilt angle of the alignment layer using an ion beam system, it is possible to adjust the alignment direction of the liquid crystal without using etching and exposure processes of the related art PVA mode, thus simplifying the manufacturing process and reducing the manufacturing cost.

Furthermore, in an LCD panel including alignment layers formed of silicon oxycarbide (SiOC) in accordance with the present invention, the transmittance of the LCD panel is improved, and thus the display quality is improved.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A liquid crystal display panel comprising:
    a lower substrate including a thin film transistor and a pixel electrode;
    an upper substrate including a common electrode facing the lower substrate;

a liquid crystal layer formed between the upper and lower substrates; and an alignment layer formed of an inorganic substance $SiOC_x$ on the upper and lower substrates, wherein x is from about 0.12 to about 1.89.

2. The liquid crystal display panel of claim 1, wherein the thickness of the alignment layer is from about 30 nm to about 500 nm.

3. The liquid crystal display panel of claim 1, wherein an alignment direction of the liquid crystal layer has a pretilt angle in the range of about 85° to about 90°, the pretilt angle being set by the inorganic substance $SiOC_x$.

4. The liquid crystal display panel of claim 1, wherein the alignment layer has a resistivity of about $1 \times 10^{15}$ Ωcm to about $3 \times 10^{15}$ Ωcm.

5. The liquid crystal display panel of claim 1, wherein the transmittance of the liquid crystal display panel, for wavelengths from 450 nm to 700 nm, is in a range from about 83% to about 86%.

6. A method of manufacturing a liquid crystal display panel, the method comprising:

forming an upper substrate including a common electrode;

forming a lower substrate including a thin film transistor and a pixel electrode and facing the upper substrate; and depositing an alignment layer on the upper and lower substrates, the alignment layer comprising an inorganic substance $SiOC_x$, wherein x is from about 0.12 to about 1.89.

7. The method of claim 6, wherein the thickness of the alignment layer is from about 30nm to about 500nm.

8. The method of claim 6, wherein the alignment layer is deposited at a temperature in a range from about 30° C. to about 400° C.

9. The method of claim 6, wherein the alignment layer has a liquid crystal alignment direction in a range from about 85° to about 90°.

10. The method of claim 6, further comprising changing the liquid crystal alignment direction on the alignment layer by using an ion beam system.

11. The method of claim 10, wherein changing the liquid crystal alignment direction comprises:

directing an ion beam at the alignment layer; and defining the liquid crystal alignment direction by setting an incident angle of the ion beam.

12. The method of claim 11, wherein the incident angle is from about 20° to about 90°.

13. The method of claim 12, wherein the liquid crystal alignment direction of the alignment layer is set at an angle from about 79° to about 90° depending on the incident angle of the ion beam.

* * * * *